United States Patent
Mian et al.

(10) Patent No.: US 10,040,465 B2
(45) Date of Patent: Aug. 7, 2018

(54) ABNORMAL VEHICLE DYNAMICS DETECTION

(71) Applicant: International Electronic Machines Corporation, Troy, NY (US)

(72) Inventors: Zahid F. Mian, Loudonville, NY (US); Ronald W. Gamache, East Greenbush, NY (US); Peter Hayes, Delmar, NY (US)

(73) Assignee: International Electronic Machines Corp., Troy, NY (US)

( * ) Notice: Subject to any disclaimer, the term of this patent is extended or adjusted under 35 U.S.C. 154(b) by 0 days.

(21) Appl. No.: 15/657,867

(22) Filed: Jul. 24, 2017

(65) Prior Publication Data

US 2017/0320508 A1    Nov. 9, 2017

Related U.S. Application Data

(63) Continuation of application No. 14/996,443, filed on Jan. 15, 2016, now Pat. No. 9,714,043.

(60) Provisional application No. 62/125,232, filed on Jan. 16, 2015.

(51) Int. Cl.
*G05D 1/00* (2006.01)
*B61L 27/00* (2006.01)
*G01H 1/00* (2006.01)
*B61L 15/00* (2006.01)

(52) U.S. Cl.
CPC ....... *B61L 27/0094* (2013.01); *B61L 15/0072* (2013.01); *B61L 15/0081* (2013.01); *B61L 27/0077* (2013.01); *G01H 1/00* (2013.01)

(58) Field of Classification Search
CPC ............ B61L 27/0094; B61L 15/0072; B61L 15/0081; B61L 27/0077; G01H 1/00
USPC .......................... 701/19; 73/570.5–672, 659
See application file for complete search history.

(56) References Cited

U.S. PATENT DOCUMENTS 5,743,495 A * 4/1998 Welles, II ............ B61L 23/047
                                                                246/121
6,371,417 B1    4/2002 Southon
6,523,411 B1    2/2003 Mian et al.
6,768,551 B2    7/2004 Mian et al.
(Continued)

FOREIGN PATENT DOCUMENTS

EP          2602168 A1    6/2013
JP          411248528    *  9/1999

OTHER PUBLICATIONS

Shafi, M., U.S. Appl. No. 14/996,443, Notice of Allowance, dated Mar. 22, 2017, 9 pages.
(Continued)

*Primary Examiner* — Muhammad Shafi
(74) *Attorney, Agent, or Firm* — LaBatt, LLC

(57) ABSTRACT

A solution for evaluating a vehicle, such as a railroad vehicle, is provided. Vibration data relating to the railroad vehicle can be acquired by vibration sensing devices located adjacent to a rail. Enhanced signal data can be generated from the vibration data acquired by the vibration sensing devices. The enhanced signal data can be evaluated for any anomalous features, such as vibration peaks. When multiple anomalous features are present, these features can be further evaluated to determine whether they indicate a presence of a defect on the railroad vehicle that is producing a periodic signal.

20 Claims, 8 Drawing Sheets

(56) References Cited

U.S. PATENT DOCUMENTS

| | | | |
|---|---|---|---|
| 6,951,132 B2* | 10/2005 | Davenport | B61L 23/044 |
| | | | 246/169 S |
| 7,478,570 B2 | 1/2009 | Mian et al. | |
| 7,564,569 B2 | 7/2009 | Mian et al. | |
| 7,841,248 B2 | 11/2010 | Mian et al. | |
| 8,925,873 B2 | 1/2015 | Gamache et al. | |
| 2004/0261533 A1* | 12/2004 | Davenport | B61L 23/044 |
| | | | 73/659 |
| 2007/0172110 A1* | 7/2007 | Adelberg | G06K 9/6255 |
| | | | 382/139 |
| 2008/0033695 A1 | 2/2008 | Sahara et al. | |
| 2009/0049936 A1 | 2/2009 | Mian et al. | |
| 2014/0110534 A1* | 4/2014 | Bartonek | B61K 9/12 |
| | | | 246/169 R |
| 2015/0115109 A1 | 4/2015 | Gamache et al. | |
| 2016/0004585 A1* | 1/2016 | Slama | G06F 11/0745 |
| | | | 714/57 |

OTHER PUBLICATIONS

Shafi, M., U.S. Appl. No. 14/996,443, Final Office Action1, dated Jan. 12, 2017, 17 pages.

Shafi, M., U.S. Appl. No. 14/996,443, Office Action1, dated Aug. 11, 2016, 26 pages.

Lee, H., International Application No. PCT/US2016/013565, International Search Report and Written Opinion, dated Apr. 20, 2016, 16 pages.

* cited by examiner

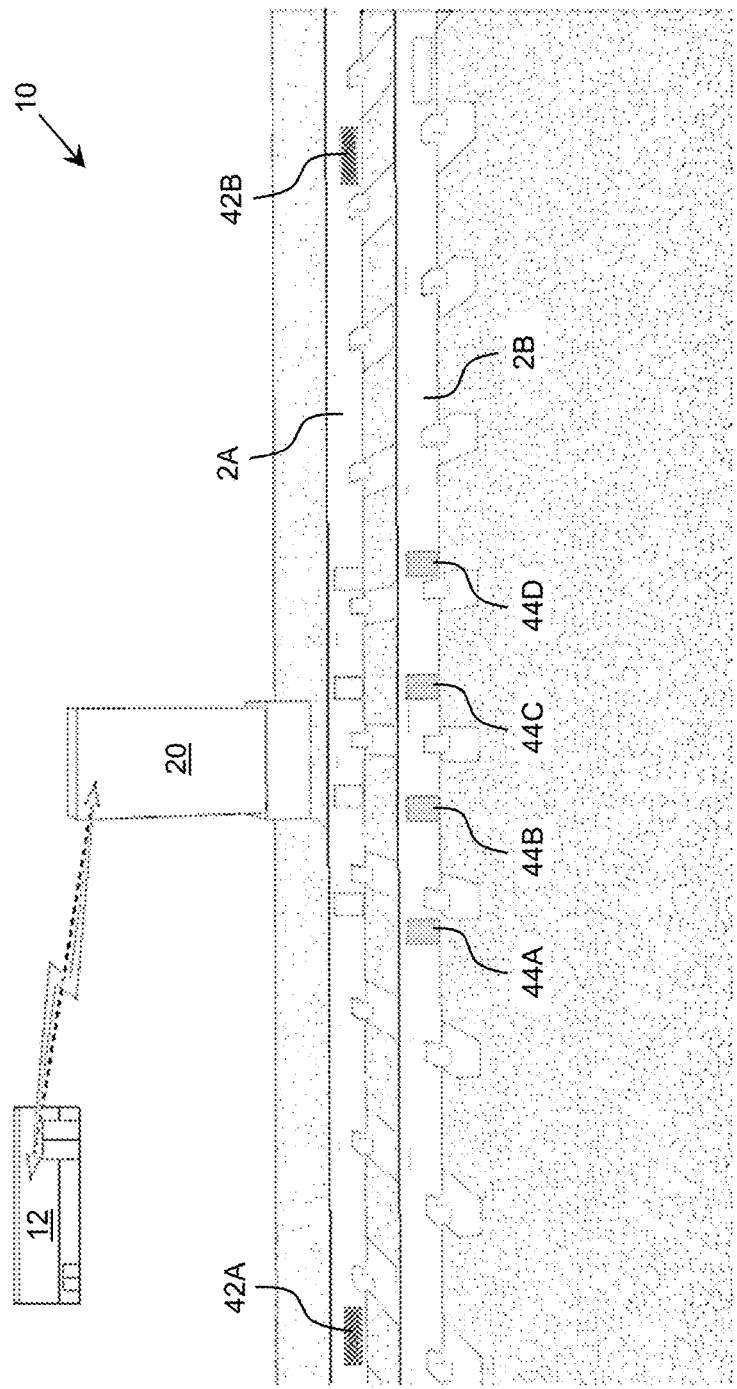

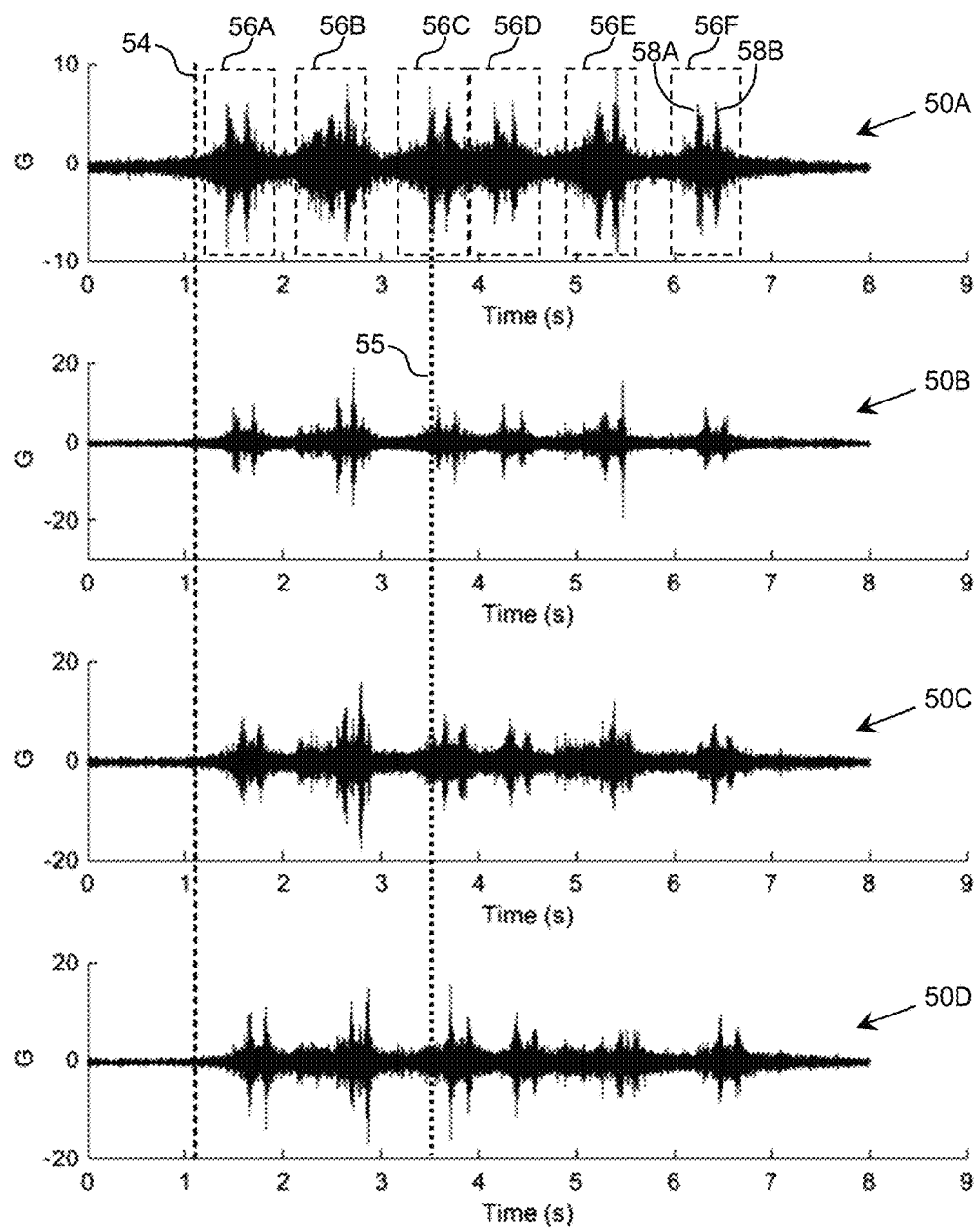

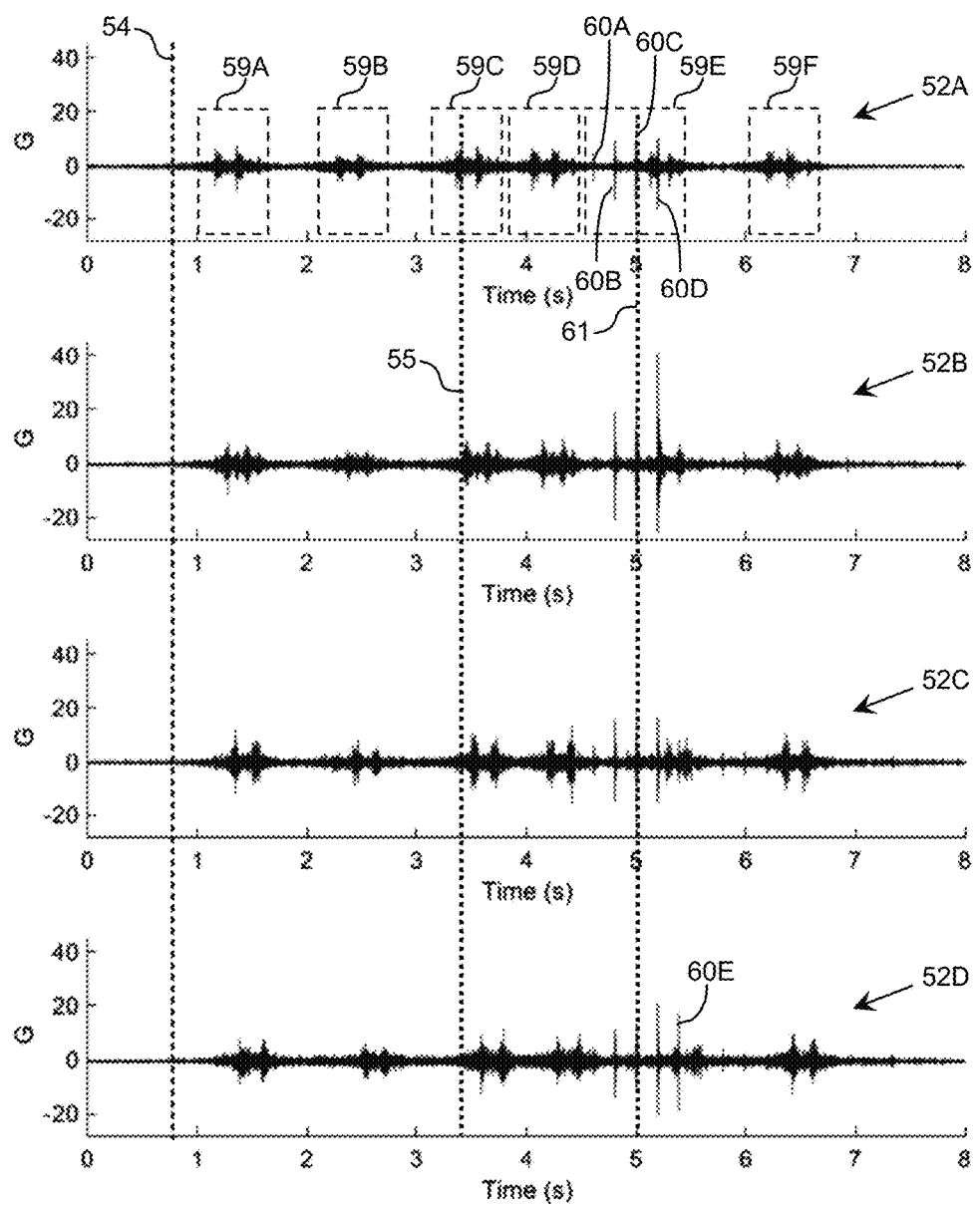

ABNORMAL VEHICLE DYNAMICS DETECTION

REFERENCE TO RELATED APPLICATIONS

The current application is a continuation of U.S. patent application Ser. No. 14/996,443, filed on 15 Jan. 2016, which claims the benefit of U.S. Provisional Application No. 62/125,232, filed on 16 Jan. 2015, each of which is hereby incorporated by reference.

TECHNICAL FIELD

The disclosure relates generally to evaluation of vehicles, and more particularly, to detection of a defect that produces a periodic signal.

BACKGROUND ART

Abnormal vehicle dynamics can indicate a pending failure of a component of a vehicle. Abnormal vehicle dynamics have numerous causes. For example, a wheel defect can cause abnormal vehicle dynamics and be an indication of a pending failure of the wheel or a wheel-related operation (e.g., braking, suspension, and/or the like). Illustrative wheel defects that can cause abnormal vehicle dynamics include wheel flats, out of round wheels, wheel shelling, broken wheels, cracked wheels, broken springs, weak suspension dampers, and/or the like.

A wheel flat is a location on the tread of a railroad wheel which has become flat instead of curved. Frequently, a wheel flat occurs due to the railroad wheel being locked and sliding during braking. To this extent, a wheel flat is also often referred to as a "slid flat." As it is flat, this section of the railroad wheel does not roll smoothly during use of the railroad wheel. In particular, each time the wheel flat rotates to contact the rail, it produces a significant impact. The impact can be detected in a number of ways, including wayside acoustic measurement, rail-based accelerometers, geophones, or optical measurement.

The impact resulting from a wheel flat is an important consequence of the presence of a wheel flat. Repeated impacts of a wheel flat cause drastically increased stresses to both the railroad wheel and rail, with vibration features that can transmit sufficient force to increase wear of other connected components. This damage can ultimately lead to a broken railroad wheel and derailment, and certainly reduces the usable lifetime of the railroad wheel as well as the rail. In passenger rail applications, wheel flats drastically increase noise and vibration, reducing ride quality. In addition, the noise and vibration can detrimentally affect systems outside of the railroad itself, either through simple noise pollution (increased noise in a neighborhood) or through the vibrations affecting sensitive systems for measurement of other quantities or of manufacturing delicate components (for example, a "fab house" for electronics may require extremely low vibration to function at all). There is thus a very strong incentive for both freight and passenger rail to detect and address wheel flats as quickly and reliably as possible.

Current art in wheel flat detection involves spacing multiple accelerometers a few feet apart along a pathway of roughly fifty feet. A typical installation will use a spacing of approximately two feet between adjacent accelerometers, thus using twenty-five accelerometers per side (a total of fifty accelerometers). The spacing is determined by the "damping" of the signal along the rail. The basic approach relies on an assumption that with a long line of spaced accelerometers, the wheel flat will rotate to the rail and cause an impact close enough to one of the accelerometers to be detected even over the noise and vibration caused by the passage of the train.

Similarly, there are systems that use an array of strain gauges located along a section of rail corresponding to at least one full revolution of a typical wheel. These systems detect the sharp peaks of strain caused by a wheel flat "hammering" the rail beneath it. Because of the varying strain of normal operation, these peaks can only be reliably detected at higher speeds, as low-speed operation masks the signal.

The current art is limited in several areas. First, depending on many conditions, the wheel flat may need to impact very close to an accelerometer or strain gauge to be reliably detected. As a result, simple geometry of rotation may lead to a flat rolling completely through the system without detection. Second, because the system must deal with powerful and variable noise from the train passage, only strong signals can be detected, which correspond with wheel flats above a certain size. As a result, smaller flats, which still can be significant in their potential to cause greater damage to the rail and railroad wheels as well as reducing fuel efficiency, go undetected. Third, because the strength of the impact signal is directly related to the speed of the train, current art systems are generally useless for trains traveling below about thirty miles per hour (about fifty kilometers per hour). As a result, current art systems cannot be successfully utilized at the entrances to railyards where the wheel flats could be immediately remedied if detected. Fourth, because the noise generated by a moving train increases drastically with speed, there is also an effective upper limit for the current-art systems of about sixty miles per hour (about one hundred kilometers per hour). Overall, current art systems have a detection rate (of the flat spots they can be expected to detect) of about eighty percent.

In addition, current art systems require sampling the accelerometers at relatively high rates of speed—over ten kHz per unit. As a result, the total data volume can easily exceed megabytes per second. Current art systems often process the data using fairly time-intensive methods, which preclude real-time detection in most cases. Other approaches attempt to utilize thresholding to identify wheel flats. However, these approaches do not provide a reliable solution.

SUMMARY OF THE INVENTION

Aspects of the invention provide a solution for addressing one or more limitations of the prior art solutions for evaluating abnormal vehicle dynamics during operation of the vehicle. In particular, embodiments can detect a defect on the vehicle, such as a railroad vehicle, that produces a periodic signal. In an illustrative embodiment, a solution for managing railroad vehicles is provided, which includes evaluating a railroad vehicle for a presence of a defect that produces a periodic signal. Vibration data relating to the railroad vehicle can be acquired by vibration sensing devices located adjacent to a rail. Enhanced signal data can be generated from the vibration data acquired by the vibration sensing devices. The enhanced signal data can be evaluated for any anomalous features, such as vibration peaks. When multiple anomalous features are present, these features can be further evaluated to determine whether they indicate a presence of a defect on the railroad vehicle that is producing a periodic signal.

A first aspect of the invention provides a method of evaluating a railroad vehicle, the method comprising: a computer system acquiring vibration data from a plurality of vibration sensing devices located along at least one rail along which the railroad vehicle is traveling; the computer system generating enhanced signal data from the vibration data acquired by the plurality of vibration sensing devices; the computer system evaluating the enhanced signal data for any anomalous vibration features; in response to identifying a plurality of anomalous vibration features in the vibration data, the computer system evaluating the plurality of anomalous vibration features for an indication of a presence of at least one defect producing a periodic signal on the railroad vehicle; and the computer system identifying the railroad vehicle as including a defect in response to identifying the indication of the defect on the railroad vehicle.

A second aspect of the invention provides a railroad vehicle management system comprising: a plurality of vibration sensing devices located adjacent to at least one rail of a set of rails on which railroad wheels travel, wherein the plurality of vibration sensing devices have a known spacing; and a computer system for evaluating the railroad vehicle, wherein the evaluating includes: acquiring vibration data from the plurality of vibration sensing devices; generating enhanced signal data from the vibration data acquired by the plurality of vibration sensing devices; evaluating the enhanced signal data for any anomalous vibration peaks; in response to identifying a plurality of anomalous vibration peaks in the vibration data, evaluating the plurality of anomalous vibration peaks for an indication of a defect on the railroad vehicle; and identifying the railroad vehicle as including a defect in response to identifying the indication of a defect on the railroad vehicle.

A third aspect of the invention provides a method of evaluating a railroad wheel for a defect, the method comprising: a computer system acquiring vibration data from a plurality of vibration sensing devices located adjacent to a rail along which the railroad wheel is traveling; the computer system generating enhanced signal data from the vibration data acquired by the plurality of vibration sensing devices; the computer system evaluating the enhanced signal data for any anomalous vibration features; and in response to identifying a plurality of anomalous vibration features in the vibration data, the computer system evaluating the plurality of anomalous vibration features for an indication of a wheel flat on the railroad wheel based on a time spacing between the plurality of anomalous vibration features.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

FIG. 2 shows another illustrative environment for evaluating a railroad vehicle according to an embodiment.

FIGS. 3A and 3B show illustrative data acquired by four vibration sensing devices for passing trains according to embodiments.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide a solution for evaluating abnormal vehicle dynamics during operation of a vehicle. In particular, embodiments can detect a defect on the vehicle, such as a railroad vehicle, that produces a periodic signal. In an illustrative embodiment, a solution for managing railroad vehicles is provided, which includes evaluating a railroad vehicle for a presence of a defect that produces a periodic signal. Vibration data relating to the railroad vehicle can be acquired by vibration sensing devices located adjacent to a rail. Enhanced signal data can be generated from the vibration data acquired by the vibration sensing devices. The enhanced signal data can be evaluated for any anomalous features, such as vibration peaks. When multiple anomalous features are present, these features can be further evaluated to determine whether they indicate a presence of a defect on the railroad vehicle that is producing a periodic signal.

Further aspects of the invention are shown and described in conjunction with evaluating a railroad vehicle for a presence of any abnormal vehicle dynamics that produce a periodic signal during operation of the railroad vehicle. In particular, an illustrative embodiment of the invention is shown and described in which railroad wheels are evaluated for the presence of wheel flats. However, it is understood that a wheel flat is only illustrative of various wheel-related defects that produce a periodic signal. To this extent, embodiments of the invention can be directed to detecting other such defects, including, for example: out of round wheels; wheel shelling; broken wheels; cracked wheels; broken springs; weak suspension dampers; and/or the like. In the illustrative embodiment described herein, vibration data is analyzed for anomalous vibration peaks. However, it is understood that vibration peaks are only illustrative of various anomalous features that can be analyzed. Other possible anomalous features include: specific patterns of vibration; average vibration level over given time periods; maximum/minimum accelerations; and/or the like.

As used herein, unless otherwise noted, the term "set" means one or more (i.e., at least one) and the phrase "any solution" means any now known or later developed solution. As used herein, unless otherwise noted, the term "approximately" includes a range of values defined by the stated value +/−ten percent and the term "substantially" includes a range of values defined by the stated value +/−five percent.

Figure 1:
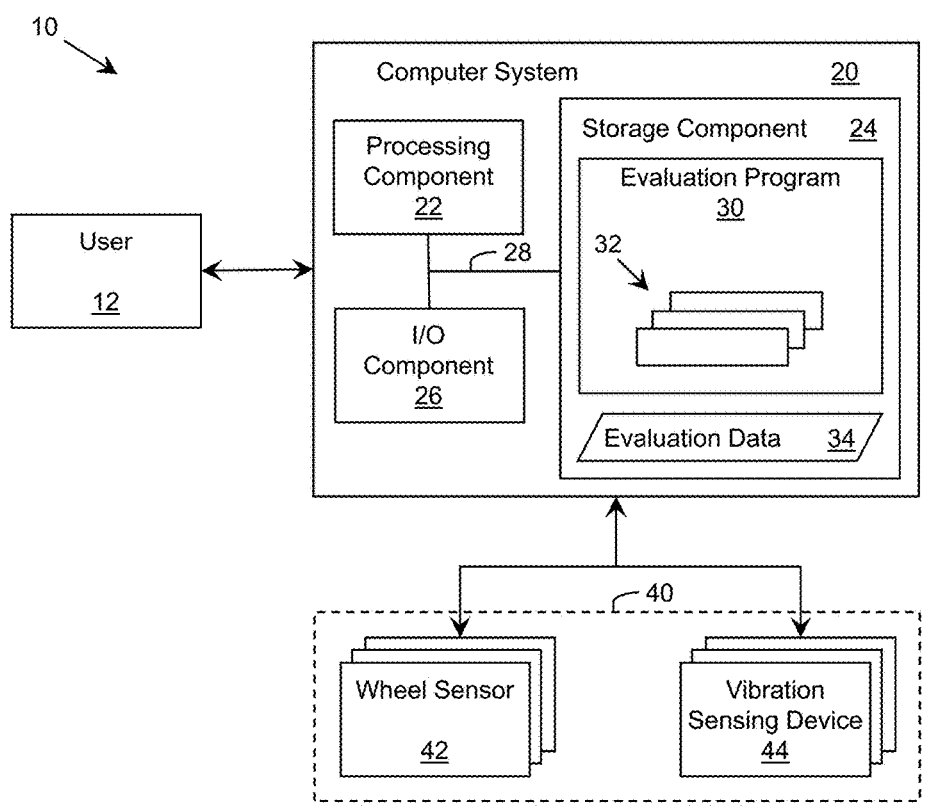
FIG. 1 shows an illustrative environment for evaluating a railroad vehicle according to an embodiment.

Turning to the drawings, FIG. 1 shows an illustrative environment 10 for evaluating a railroad vehicle according to an embodiment. To this extent, the environment 10 includes a computer system 20 that can perform a process described herein in order to evaluate one or more attributes of the railroad vehicle. In particular, the computer system 20 is shown including an evaluation program 30, which makes the computer system 20 operable to evaluate the railroad vehicle by performing a process described herein.

The computer system 20 is shown including a processing component 22 (e.g., one or more processors), a storage component 24 (e.g., a storage hierarchy), an input/output (I/O) component 26 (e.g., one or more I/O interfaces and/or devices), and a communications pathway 28. In general, the processing component 22 executes program code, such as the evaluation program 30, which is at least partially fixed in storage component 24. While executing program code, the processing component 22 can process data, which can result in reading and/or writing transformed data from/to the storage component 24 and/or the I/O component 26 for further processing. The pathway 28 provides a communications link between each of the components in the computer system 20. The I/O component 26 can comprise one or more human I/O devices, which enable a human user 12 to interact with the computer system 20 and/or one or more communications devices to enable a system user 12 to communicate with the computer system 20 using any type of communications link. To this extent, the evaluation program 30 can manage a set of interfaces (e.g., graphical user interface(s), application program interface, and/or the like) that enable human and/or system users 12 to interact with the evaluation program 30. Furthermore, the evaluation program 30 can manage (e.g., store, retrieve, create, manipulate, organize, present, etc.) the data, such as evaluation data 34, using any solution.

In any event, the computer system 20 can comprise one or more general purpose computing articles of manufacture (e.g., computing devices) capable of executing program code, such as the evaluation program 30, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, the evaluation program 30 can be embodied as any combination of system software and/or application software.

Furthermore, the evaluation program 30 can be implemented using a set of modules 32. In this case, a module 32 can enable the computer system 20 to perform a set of tasks used by the evaluation program 30, and can be separately developed and/or implemented apart from other portions of the evaluation program 30. As used herein, the term "component" means any configuration of hardware, with or without software, which implements the functionality described in conjunction therewith using any solution, while the term "module" means program code that enables a computer system 20 to implement the actions described in conjunction therewith using any solution. When fixed in a storage component 24 of a computer system 20 that includes a processing component 22, a module is a substantial portion of a component that implements the actions. Regardless, it is understood that two or more components, modules, and/or systems may share some/all of their respective hardware and/or software. Furthermore, it is understood that some of the functionality discussed herein may not be implemented or additional functionality may be included as part of the computer system 20.

When the computer system 20 comprises multiple computing devices, each computing device can have only a portion of the evaluation program 30 fixed thereon (e.g., one or more modules 32). However, it is understood that the computer system 20 and the evaluation program 30 are only representative of various possible equivalent computer systems that may perform a process described herein. To this extent, in other embodiments, the functionality provided by the computer system 20 and the evaluation program 30 can be at least partially implemented by one or more computing devices that include any combination of general and/or specific purpose hardware with or without program code. In each embodiment, the hardware and program code, if included, can be created using standard engineering and programming techniques, respectively.

Regardless, when the computer system 20 includes multiple computing devices, the computing devices can communicate over any type of communications link. Furthermore, while performing a process described herein, the computer system 20 can communicate with one or more other computer systems, devices, sensors, and/or the like, using any type of communications link. In either case, the communications link can comprise any combination of various types of optical fiber, wired, and/or wireless links; comprise any combination of one or more types of networks; and/or utilize any combination of various types of transmission techniques and protocols.

As discussed herein, the evaluation program 30 enables the computer system 20 to evaluate a railroad vehicle for a presence of a defect producing a periodic signal. To this extent, the environment 10 includes a set of sensing devices 40 for acquiring data corresponding to one or more attributes of the railroad vehicle being evaluated. The set of sensing devices 40 can acquire the data using any solution, and provide the computer system 20 with data corresponding to the one or more attributes (e.g., using a wired and/or wireless communications solution). Such data can comprise raw data acquired by a sensor, pre-processed data, and/or the like. Regardless, the computer system 20 can store the data as evaluation data 34 and perform further processing to evaluate the attribute(s) of the railroad wheel as described herein. Such further processing can result in the evaluation of the railroad vehicle and generation of additional data (e.g., a railroad vehicle fingerprint), which the computer system 20 also can store as evaluation data 34.

As described herein, the environment 10 is configured to evaluate a railroad vehicle, and particularly the railroad wheels of a railroad vehicle. To this extent, the set of sensing devices 40 can include a set of wheel sensors 42, each of which is configured to detect a railroad wheel passing a location on a rail. In a more specific embodiment, evaluation of the railroad wheel includes determining whether the railroad wheel includes one or more flat spots. To this extent, the set of sensing devices 40 can include a set of sensing devices configured to acquire data corresponding to a vibration created by flat spot(s) on a railroad wheel as it rolls along a rail. In an illustrative embodiment described herein, the set of sensing devices 40 includes at least two vibration sensing devices 44, which acquire data corresponding to vibrations induced in the rail as rail wheel(s) travel there over. In a more particular illustrative embodiment, the vibration sensing devices 44 are accelerometers.

While the set of sensing devices 40 is shown including two types of sensing devices (e.g., the wheel sensor(s) 42 and the vibration sensing device(s) 44), it is understood that embodiments of the environment 10 can include a set of sensing devices 40 comprising any combination of one or more types of sensing devices. To this extent, an embodiment of the set of sensing devices 40 can be implemented without any wheel sensors 42. Furthermore, an embodiment of the set of sensing devices 40 can comprise a different type of vibration sensing device 44 other than an accelerometer, such as a strain gauge (e.g., a fiber Bragg grating (FBG) sensor), a geophone, a laser vibrometer, and/or the like. As used herein, it is understood that the term "vibration sensing device" is inclusive of devices that measure vibration directly (e.g., a geophone) and devices that measure vibration indirectly (e.g., accelerometers, which measure acceleration and strain gauges, which measure deflection).

Additionally, it is understood that the set of sensing devices 40 can include any of various additional types of sensing devices, which can provide other data for processing by the computer system 20 to evaluate any combination of various attributes of the railroad vehicle. Illustrative types of sensing devices include: an infrared and/or visible imaging device; an acoustic sensor; a magnetic sensor; and/or the like. It is also understood that embodiments can include one or more other components configured to operate in conjunction with a sensor device (e.g., lighting, laser line generator, loudspeaker, and/or the like), as well as housing and other components for protecting the set of sensing devices 40 from the ambient environment. For example, in a transit (e.g., mass transit) application, the presence of high voltage may require one or more of the set of sensing devices 40 to be heavily insulated for protection from damage.

FIG. 2 shows another illustrative environment 10 for evaluating a railroad vehicle according to an embodiment. In this case, the environment 10 is located at an evaluation area of a pair of rails 2A, 2B over which railroad vehicles (e.g., individual rail vehicles, consists, trains, and/or the like) travel. While the environment 10 is shown including two rails 2A, 2B, it is understood that embodiments of the environment can include any number of one or more rails. The environment 10 can be configured to evaluate any combination of various types of railroad vehicles including, for example, locomotives, passenger railcars, various types of freight rail vehicles, recreational rail vehicles (e.g., roller coaster), and/or the like.

Regardless, the environment 10 is shown including a computer system 20, which is located adjacent to the pair of rails 2A, 2B, e.g., in a wayside bungalow. As described herein, the computer system 20 can be configured to receive data from a set of sensing devices 40 (FIG. 1) and process the data to evaluate one or more attributes of railroad vehicles traveling along the pair of rails 2A, 2B. Furthermore, the computer system 20 can communicate information regarding the evaluation to a user system 12, which can initiate one or more actions, if necessary, in response to the evaluation.

The set of sensing devices 40 of the environment 10 includes a pair of wheel sensors 42A, 42B mounted on a gauge side of the rail 2A. Each wheel sensor 42A, 42B can comprise any type of sensing device capable of detecting a railroad wheel passing there over. For example, the wheel sensors 42A, 42B can comprise inductance-based wheel sensors. The environment 10 is shown including wheel sensors 42A, 42B on both sides of the evaluation area. In this configuration, railroad wheels approaching from either direction as well as the departure of a railroad wheel from the evaluation area can be detected. However, it is understood that an embodiment can include only a wheel sensor 42A, 42B located on one side of the evaluation area, e.g., when the railroad wheels will only travel through the evaluation area from a single direction without stopping or changing direction. Furthermore, it is understood that the environment 10 can include wheel sensors 42A, 42B installed on each rail 2A, 2B, or only installed on a subset of the rails 2A, 2B.

When included, the wheel sensor(s) 42A, 42B can enable one or more other components in the environment 10 to be shut down and/or placed in a low power mode when no railroad wheels are traveling through the evaluation area. To this extent, the wheel sensor(s) 42A, 42B can be located a sufficient distance from other components in the environment 10 to enable such components to be reactivated in response to an approaching railroad wheel. Such placement can be determined based on the maximum speed at which a railroad wheel will travel through the evaluation area as well as an amount of time required to reactivate the corresponding components. Furthermore, as railroad wheels located on connected rail vehicles are spaced at well-known distances and travel at a known range of speeds, an appropriate time interval during which no railroad wheels have been detected can be set after which the component(s) can be shut down and/or placed in a low power mode since the last of the connected rail vehicles will have departed the evaluation area.

The set of sensors 40 also is shown including four vibration sensing devices 44A-44D mounted to a field side of the rail 2B. As indicated in phantom, the rail 2A also can include a similar set of vibration sensing devices 44A-44D mounted thereon for evaluation of railroad wheels traveling there over. However, it is understood that the vibration sensing devices 44A-44D do not need to be mounted to a corresponding rail 2A, 2B. To this extent, in another embodiment, the vibration sensing devices 44A-44D can be mounted in close proximity and mechanically coupled to a corresponding rail 2A, 2B. The vibration sensing devices 44A-44D can be spaced a fixed distance from one another and be sampled at a rate sufficient to provide enough data for reliably evaluating the railroad wheels traveling there over. In a more specific embodiment, the four vibration sensing devices 44A-44D are located at approximately two foot (0.6 meter) intervals and are sampled at a rate of at least approximately six kilohertz.

However, it is understood that the number, spacing, and frequency of sampling for the vibration sensing devices 44A-44D are only illustrative and numerous alternative configurations can be implemented. To this extent, a number of vibration sensing devices 44A-44D can be selected based on a diameter of the rail wheels being analyzed. In particular, as a diameter of the rail wheel increases, a number of vibration sensing devices 44A-44D can increase. In an illustrative embodiment, the number of vibration sensing devices 44A-44D can be selected to provide sufficient coverage of a rail segment having a length two to three times the circumference of the rail wheels.

In an embodiment, the sampling rate is selected based on a characteristic (primary) frequency generated by a target railroad vehicle component, such as the rail wheels of the railroad vehicle. For example, the sampling rate can be selected to be at least twice the characteristic frequency of the relevant defect. For evaluating a rail wheel for the presence of a wheel flat, the characteristic frequency of the wheel flat signal is approximately 1100 Hertz. To this extent, the sampling rate can be at least 2200 Hertz. In an embodiment, a higher sampling rate can be selected to provide additional data coverage. To this extent, a sampling rate in a range between four and eight times the characteristic frequency can be utilized in a more particular embodiment. In an embodiment, a sampling rate is selected to satisfy the Nyquist criterion for detecting a corresponding defect signal.

An embodiment can include any number of two or more vibration sensing devices, e.g., in a range of up to approximately twenty-five vibration sensing devices per rail 2A, 2B. However, embodiments can be implemented using significantly fewer vibration sensing devices per rail 2A, 2B than twenty-five. For example, embodiments can include between two and twelve vibration sensing devices per rail 2A, 2B. In another illustrative embodiment, eight vibration sensing devices are located adjacent to one or each of the rails 2A, 2B. Similarly, an embodiment can utilize any sampling rate, e.g., up to approximately ten kilohertz or more.

Figure 7:
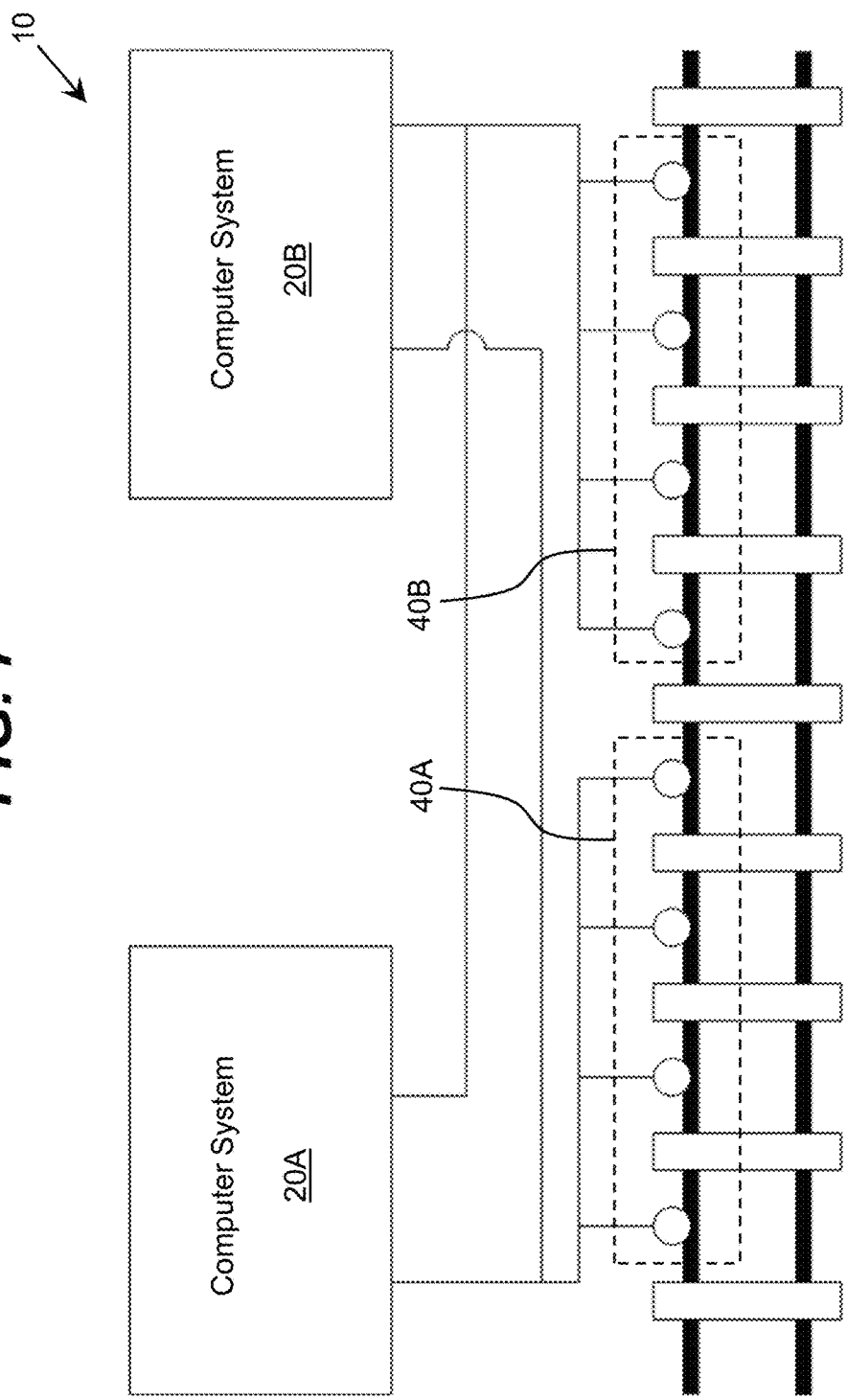
FIG. 7 shows an illustrative environment for evaluating a railroad vehicle according to an embodiment.

The spacing between the vibration sensing devices 44A-44D also can be selected based on the size of the railroad wheels, ambient conditions for the sampling, a total number of vibration sensing devices 44A-44D, and/or the like. For example, in an embodiment (e.g., as shown in FIG. 7), the vibration sensing devices 44A-44D can be mounted in approximately a center of the crib (the spacing between two adjacent ties supporting the rail), which can have a higher vibration signal than locations closer to a tie.

Regardless, the number, spacing, and frequency of sampling for the vibration sensing devices 44A-44D can be selected to provide sufficient data for evaluating the railroad wheels with at least a target level of accuracy. It is understood that the target level of accuracy can vary based on the application and can be selected based on a minimum size of a defect to be detected, a maximum acceptable percentage of false positives and/or false negatives, an acceptability of operation despite one or more vibration sensing devices 44A-44D failing, and/or the like.

As railroad wheels travel over the rails 2A, 2B, the computer system 20 can acquire data indicating approaching railroad wheels from the wheel sensor(s) 42A, 42B, and data corresponding to the vibrations and impacts on the rails 2A, 2B created by the railroad wheels traveling thereon at the specified sampling rate (e.g., six kilohertz) from the vibration sensing devices 44A-44D. In an embodiment, the computer system 20 is physically connected to the wheel sensor(s) 42A, 42B and/or the vibration sensing devices 44A-44D, e.g., via a wired connection, through which the computer system 20 receives the corresponding data and/or provides power and/or control signals for operation of the wheel sensor(s) 42A, 42B and/or the vibration sensing devices 44A-44D. Alternatively, the computer system 20 can communicate with (e.g., send control signals to and/or receive data from) the wheel sensor(s) 42A, 42B and/or the vibration sensing devices 44A-44D using a wireless communications solution. Similarly, the computer system 20 can communicate with the user system 12 using a wired and/or wireless communications solution.

As discussed herein, the computer system 20 can receive and process data acquired from the vibration sensing devices 44A-44D to evaluate railroad wheel(s) traveling through the evaluation area, e.g., for the presence of one or more flat spots. FIGS. 3A and 3B show illustrative data acquired by vibration sensing devices 44A-44D (FIG. 2) for passing trains according to embodiments. In both FIGS. 3A and 3B, four sets of signal data 50A-50D (FIG. 3A) and 52A-52D (FIG. 3B) are shown, each of which corresponds to signal data acquired by a vibration sensing device 44A-44D, respectively. In each case, the train was a transit train including two passenger cars and a motor car, each of which included two wheel trucks, with each wheel truck holding two wheels on each rail 2A, 2B. As a result, the train included a total of twelve wheels that passed over each rail 2A, 2B (FIG. 2). The signal data shown in FIGS. 3A and 3B correspond to data acquired by vibration sensing devices 44A-44D located on only one of the rails 2A, 2B.

As can be seen, the signal data 50A-50D, 52A-52D acquired by each vibration sensing device 44A-44D have a similar general pattern of increasing and decreasing vibration due to the passage of each set of railroad wheels on each railroad vehicle. It is understood that a particular pattern of vibration may vary, for example, depending on the specific type of railroad vehicle. In both FIGS. 3A and 3B, a noise floor in the signal data 50A-50D, 52A-52D begins to significantly increase at a time 54. In an embodiment, the computer system 20 (FIG. 1) can use detection of such an increase as a trigger to commence data collection. In a more particular embodiment, the computer system 20 uses a cutoff of approximately two times the acceleration from gravity (1G=9.8 meters/second$^2$) in order to trigger data collection. Additionally, the computer system 20 can use the same cutoff together with an amount of time in which the frequency has not exceeded the cutoff in order to stop data collection. To this extent, an embodiment of the environment 10 can be implemented without any wheel sensors 42 (FIG. 1), although inclusion of such wheel sensors 42 can provide one or more additional benefits, such as redundancy and a data enabling confirmation that the system is operating correctly, improved reliability and fault tolerance, and/or the like.

In an embodiment, the computer system 20 can adjust the signal data 50A-50D, 52A-52D acquired by different vibration sensing devices 44A-44D, e.g., to adjust for a vibration sensing device 44A-44D consistently detecting higher or lower vibrations than the other vibration sensing devices 44A-44D. For example, in a more particular embodiment, the computer system 20 can determine a baseline bias/noise level for each vibration sensing device 44A-44D, which can be applied to the raw signal data 52A-52D acquired by the corresponding vibration sensing device 44A-44D to produce corrected signal data. The computer system 20 can subsequently perform further analysis and processing on the corrected signal data. To accommodate any bias and variation in the signal data acquired by a vibration sensing device 44A-44D due to aging, temperature, and/or the like, an embodiment can periodically collect baseline signal data 50A-50D from the vibration sensing devices 44A-44D when no train is present and use this baseline data to derive current bias/noise levels for each vibration sensing device 44A-44D, which the computer system 20 can apply to the raw signal data 50A-50D acquired while a train is passing to produce the corrected signal data for each vibration sensing device 44A-44D.

In the signal data 50A-50D shown in FIG. 3A, none of the wheels on the train included a detectable flat spot. As indicated in the signal data 50A, the passing of a truck can be identified by a significant overall increase and subsequent decrease in the vibration. To this extent, the computer system 20 can correlate each of six regions 56A-56F of the signal data 50A with the passing of each of the six wheel trucks on the train. Furthermore, as indicated in conjunction with the region 56F, each of the regions 56A-56F includes a pair of peaks 58A, 58B. The computer system 20 also can correlate each of the peaks 58A, 58B within a region 56A-56F with the passage of each wheel of the wheel truck. As indicated by the time 55, which corresponds to the peak resulting from passage of the first wheel of the third wheel truck on the train, the peak vibration resulting from the passage of each railroad wheel over a vibration sensing device 44A-44D occurs at a slightly different time for each vibration sensing device 44A-44D due to their different locations along the rail. To this extent, each region 56A-56F also will shift slightly in time in the signal data 50A-50D acquired by each vibration sensing device 44A-44D.

In the signal data 52A-52D shown in FIG. 3B, one of the railroad wheels on the train included a significant wheel flat, which was obvious from a visual inspection of the railroad wheel. In particular, as illustrated in the signal data 52A, five of the six regions 59A-59F corresponding to the six wheel trucks on the train has a significant overall increase and subsequent decrease with a pair of peaks correlated with the passing of a wheel truck. However, the region 59E corresponds to a significantly longer time period than the other regions 59A-59D, 59F and includes multiple anomalous peaks 60A-60E located on the leading portion of the region 59F.

As illustrated, one or more of the anomalous peaks 60A-60E can be present in only a subset of the signal data 52A-52D. For example, the anomalous peak 60A appears in the signal data 52A, 52C, but is not present in the signal data 52B, 52D. Conversely, the anomalous peak 60E can be seen in the signal data 52B, 52D, but is not present in the signal data 52A, 52C. However, the central anomalous peaks 60B-60D are clearly visible in all of the signal data 52A-52D. In the signal data 52A-52C, the trailing portion of the region 59F the anomalous peak 60E is either not present or is not readily distinguishable from other peaks marking the passing of a second wheel of a wheel truck and gradual decrease similar to that of the other wheel trucks.

In an embodiment, the computer system 20 can process the signal data 52A-52D and correlate the signal data for the region 59E as indicative of a wheel flat on the lead wheel of the fifth truck. For example, the computer system 20 can identify the anomalous peaks 60A-60E using any solution. In an embodiment, the computer system 20 identifies an anomalous peak 60A-60E based on a magnitude of the peak 60A-60E. For example, the computer system 20 can use a threshold value and identify any peak vibration in the signal data 52A-52D exceeding the threshold value. Furthermore, the computer system 20 can identify an anomalous peak 60A-60E based on the vibration signature surrounding a peak. For example, as previously discussed, passage of a wheel truck is generally characterized by a gradual increase in vibration, two peaks and a gradual decrease in vibration. In contrast, the anomalous peaks 60A-60C are not preceded and followed by gradual increases and decreases in vibration. In this case, the computer system 20 can identify an anomalous peak 60A-60C based on exceeding a threshold minimum increase in vibration (e.g., a minimum magnitude, a minimum percent increase, and/or the like), which lasts a sufficiently short duration (e.g., less than 0.05 seconds).

After identifying a set of potential anomalous vibration data, the computer system 20 can determine whether the anomalous vibration data includes one or more anomalies that are periodic, e.g., have a substantially uniform (e.g., within +/−five percent) time spacing. To this extent, the computer system 20 can analyze the anomalous peaks 60A-60E for a substantially uniform time spacing. As the total distance for the vibration sensing devices 44A-44D is relatively small (e.g., approximately six feet or two meters in an embodiment), the computer system 20 can assume that a train traveling at a sufficient speed will not experience any significant acceleration or deceleration as it travels past the vibration sensing devices 44A-44D. In this case, the computer system 20 can initially determine that anomalous peaks 60A-60E occurring at regular time intervals correspond to the same wheel flat spot striking the rail. In this case, the computer system 20 can group anomalous peaks 60A-60E occurring at substantially regular intervals together as being potentially related to the same defect (e.g., flat spot).

When the computer system 20 identifies anomalous peaks 60A-60E occurring at regular intervals, when known, the computer system 20 can use a known base operating frequency for a relevant rail vehicle component to determine whether the time intervals for a group of anomalous peaks 60A-60E correlates with the base operating frequency. For example, when the relevant rail vehicle component is a rail wheel or a component related thereto (e.g., an axle), the computer system 20 can use the wheel dimension and a known speed for the train as it passes the vibration sensing devices 44A-44D to determine whether the time intervals for a group of anomalous peaks 60A-60E correlates with a single wheel revolution of the rail wheel (e.g., indicating a flat spot on the railroad wheel). For example, for the train generating the signal data 52A-52D, the anomalous peaks 60A-60E are present at regular intervals of approximately 0.2 seconds. Additionally, the train included wheels of a diameter of approximately 29 inches (0.74 meters) and a circumference of approximately 7.59 feet (2.31 meters) and had a nominal speed of approximately twenty-five miles per hour (40.23 kilometers per hour). These wheel and train attributes correspond to a wheel revolution about every 0.207 seconds, which correlates well with the identified spacing for the anomalous peaks 60A-60E. As a result, the anomalous peaks 60A-60E appear to be at an interval of approximately (e.g., within +/−ten percent of) one revolution of a railroad wheel, or exactly what would be expected for a railroad wheel having a wheel flat. As a result, the computer system 20 can evaluate the anomalous peaks 60A-60E as being indicative of a single flat spot on a single railroad wheel.

In an embodiment, the computer system 20 can combine the signal data 52A-52D acquired by the vibration sensing devices 44A-44D to identify the presence of anomalous peaks indicative of any defects, such as wheel flats. In particular, as illustrated by time 61, a peak vibration resulting from an impact of a flat spot on a rail will occur at substantially the same time at each of the vibration sensing devices 44A-44D. This is due to the temporal coherence of the wheel flat signals, which are discrete impacts transmitted through the rail at the speed of sound in steel (~4300 meters/sec or almost 14,000 feet/sec). In effect, all four vibration sensing devices 44A-44D are impacted by the wheel flat signal at effectively the same time.

For example, using the illustrative spacing described herein, there is a difference of approximately 143 microseconds between the timing of the impact between adjacent vibration sensing devices 44A-44D on the same side of the impact. For four vibration sensing devices 44A-44D described herein, a maximum difference in the timing is approximately 429 microseconds. This amount of time is approximately $\frac{1}{500}^{th}$ of the time for a railroad wheel described herein to complete one revolution and is comparable to a sampling period (e.g., for six kilohertz sampling rate, the sampling period is approximately 167 microseconds). As a result, the signal resulting from an impact of a flat spot will occur over a very short time window compared to the wheel noise, and will result in anomalous peaks 60A-60E in the signal data 52A-52D, which appear at times highly temporally coherent (e.g., within two or three samples or up to eight samples in some embodiments) between the four vibration sensing devices 44A-44D. In contrast, as discussed herein, general noise generated by the wheel movement is not temporally discrete or coherent except in a very broad manner, since the noise the wheels make is not dependent on the wheel itself but on the wheel surface, the rail surface, the loading of the wheel, and other factors.

Figure 4:
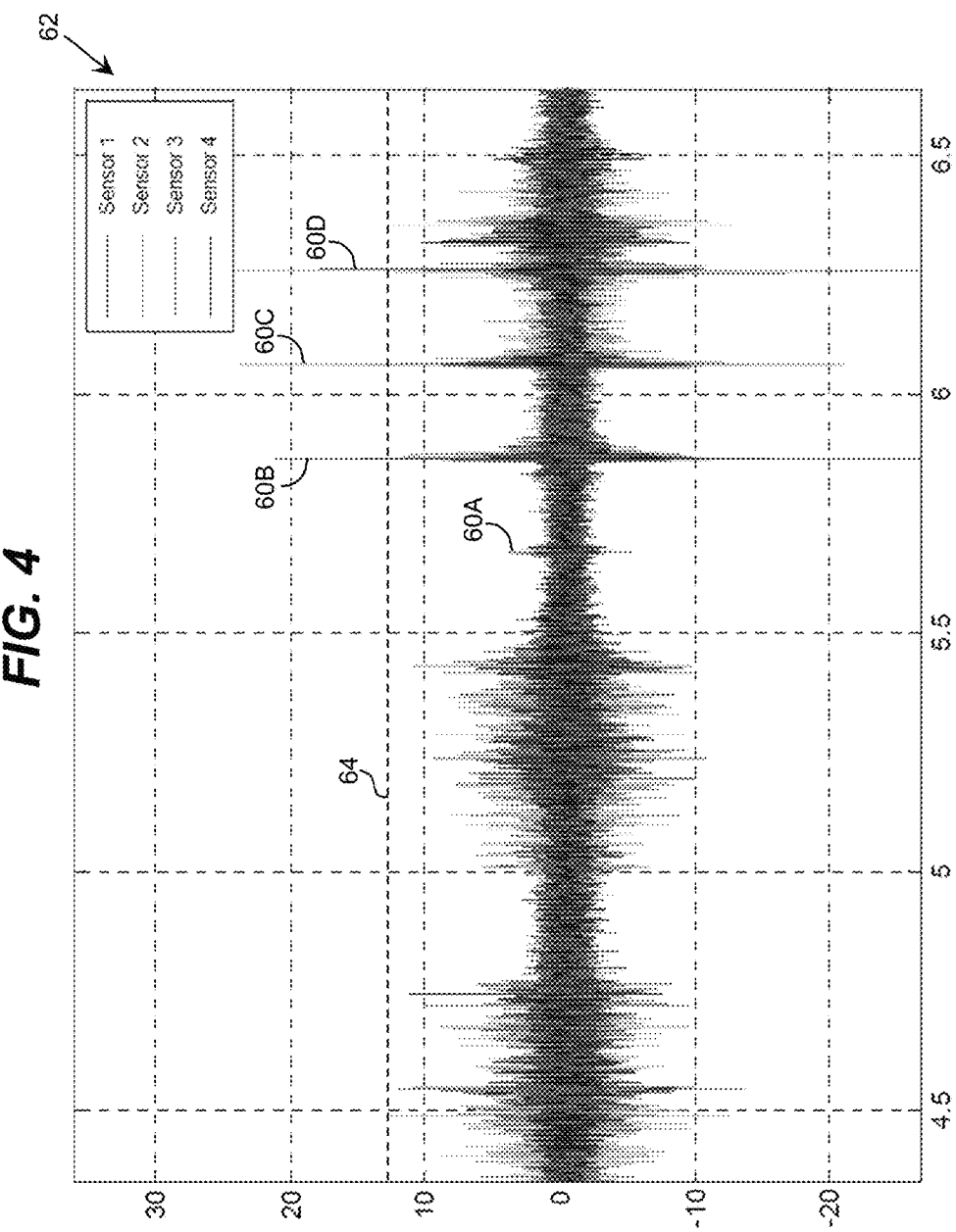
FIG. 4 shows an illustrative overlay of signal data according to an embodiment.

To this extent, FIG. 4 shows an overlay of signal data, which the computer system 20 can generate from signal data similar to the signal data 52A-52D shown in FIG. 3B, according to an embodiment. In this case, the computer system 20 can combine the signal data 52A-52D by overlapping the various signal data to create combined signal data 62 representing a combination of all of the signal data 52A-52D acquired by the vibration sensing devices 44A-44D. It is understood that the computer system 20 can perform one or more manipulations of the signal data 52A-52D while or prior to generating the combined signal data 62. For example, the computer system 20 can stretch and/or condense some or all of the signal data 52A-52D in one or more directions (e.g., to adjust the time and/or the magnitude of the vibrations).

As illustrated in the combined signal data 62, the anomalous peaks 60B-60D can be readily distinguished from other peaks resulting from the passage of railroad wheels without any significant defects, e.g., flat spots in the current illustrative embodiment. In particular, the anomalous peaks 60B-60D are not as temporally spread apart as the peaks resulting from normal wheel passage, which result in the combined signal data 62 having a longer duration of higher noise than that of any of the individual sensor data 52A-52D. Similarly, the anomalous peak 60A can be readily distinguished from the surrounding noise as it lasts for a relatively short duration and occurs at substantially the same time in the sensor data acquired by multiple sensors.

Additionally, the computer system 20 can use a threshold level of vibration to identify at least a subset of anomalous peaks 60B-60D in the combined signal data 62. For example, the computer system 20 can select a maximum vibration level 64 beyond which a peak can be identified as a suspect anomalous peak. In the combined signal data 62, the computer system 20 can use a maximum vibration level 64 of approximately 11G-12G, where G is the acceleration due to gravity. However, it is understood that this is only illustrative, and the maximum vibration level 64 can be selected using any solution. For example, the maximum vibration level 64 can be selected after conducting a series of training runs over a particular installation location with a particular set of vibration sensing devices 44A-44D installed thereon. The training runs can include trains having a typical configuration and traveling at typical speeds as will be traveling during normal use, and include trains having known defects (e.g., railroad wheels with one or more flat spots) as well as trains having no known defects (e.g., no railroad wheels with any flat spots).

The computer system 20 can perform one or more additional or alternative operations to assist in identifying anomalous peaks 60A-60E present in the signal data 52A-52D acquired by the different vibration sensing devices 44A-44D. For example, in an embodiment, the computer system 20 can generate enhanced signal data by fusing the signal data 52A-52D. To this extent, the computer system 20 can generate the enhanced signal data by adding the signal data 52A-52D for a given time slice using any solution. The computer system 20 can use the actual signal data 52A-52D acquired by the vibration sensing devices 44A-44D or perform pre-processing on some or all of the signal data 52A-52D (e.g., normalization) prior to generating the enhanced signal data. In an embodiment, the computer system 20 can generate unique signal data for each of the signal data 52A-52D. Subsequently, the computer system 20 can add the unique signal data generated for each of the signal data 52A-52D to generate the enhanced signal data. As a spatial extent of a typical wheel flat hit in a typical rail installation is less than ten feet and the wheel flat hit generates a relatively broad range of lower frequencies, the corresponding peaks have significant overlap and can be within 2-3 sampling periods when a sampling period of six kHz is utilized. However, it is understood that further overlap can be obtained for different sampling periods and/or different extents by combining the data (e.g., by averaging) from multiple adjacent sampling periods before or after adding the signal data.

Figure 5:
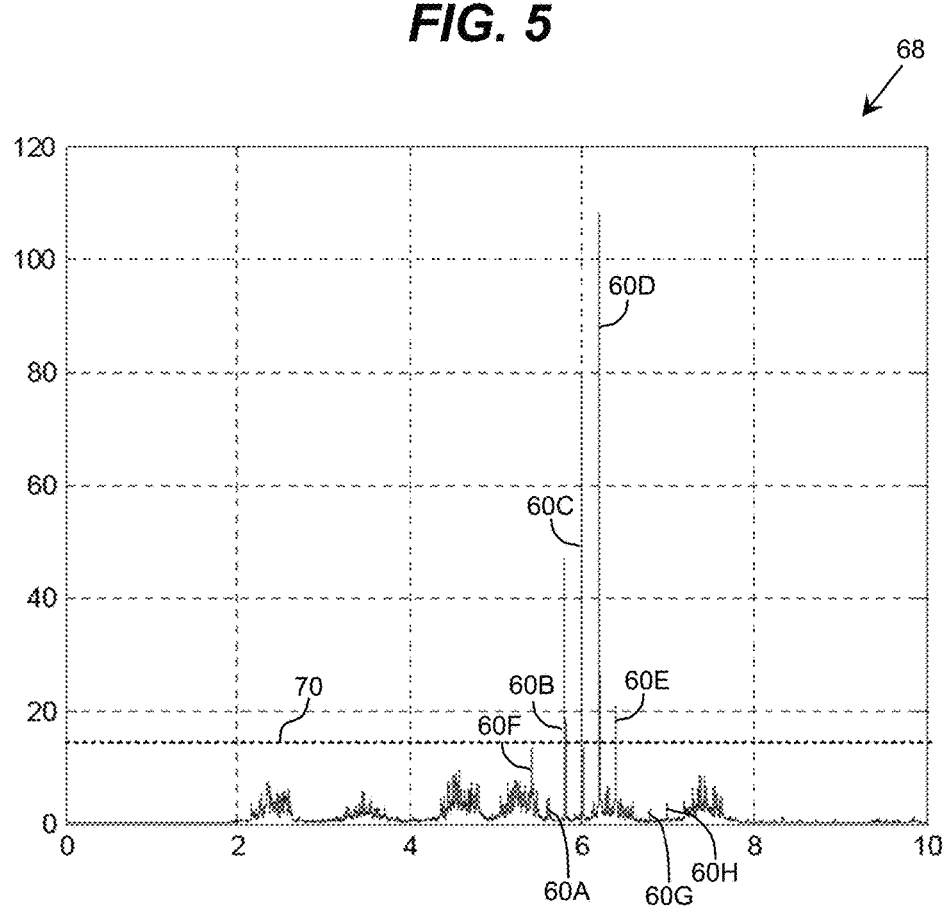
FIG. 5 shows illustrative enhanced signal data according to an embodiment.

FIG. 5 shows illustrative enhanced signal data 68, which the computer system 20 can generate from signal data similar to the signal data 52A-52D shown in FIG. 3B, according to an embodiment. As illustrated, since the background peaks occurring during operation of a normal railroad wheel are not strongly coherent in time, adding these peaks does not result in a significant increase in the enhanced signal data 68. Rather, these peaks tend to average themselves out. In fact, most noise peaks remain well below a maximum noise peak level 70 of approximately 15G, which is only slightly higher than the 11G-12G maximum vibration level 64 shown in FIG. 4. In contrast, as the anomalous peaks 60B-60E resulting from a wheel flat spot impact are detected nearly concurrently by the vibration sensing devices 44A-44D, the enhanced signal data 68 results in highly enhanced anomalous peaks 60B-60E. Unlike the combined signal data 62 (FIG. 4), the anomalous peak 60E can be readily identified in the enhanced signal data 68 using a threshold value.

Furthermore, using a more complex anomalous peak identification solution, the computer system 20 can identify additional anomalous peaks present in the data, which are likely due to the periodic impacts of a wheel flat spot within the enhanced signal data 68. For example, the computer system 20 can identify the anomalous peak 60A, as well as additional anomalous peaks 60F-60H based on such peaks exceeding a threshold minimum percent increase and subsequent decrease in vibration, which lasts a sufficiently short duration. Furthermore, the computer system 20 can evaluate the time at which these anomalous peaks 60F-60H occur in conjunction with the timing of the clearly anomalous peaks 60B-60E and determine that these peaks also occur at time intervals correlated with the revolution of the same railroad wheel and the same flat spot impacting the rail. As illustrated, particularly by extraction of the anomalous peak 60F from the enhanced signal data 68, which also can be detected by using a threshold level lower than the vibration level 70, use of the enhanced signal data 68 can enable the computer system 20 to detect flat spots smaller in size than the flat spot present on the railroad wheel used to generate the enhanced signal data 68.

The computer system 20 can perform further analysis on sensor data 52A-52D, which can enable the computer system 20 to extract additional information. For example, in an embodiment, the computer system 20 can perform a cepstrum-based analysis of the sensor data 52A-52D. Cepstrum analysis can provide a powerful tool for enabling the computer system 20 to extract periodic signals from noisy environments in which something about the periodic limits is known. In the current illustrative embodiment in which wheel flat spots are being identified, it is known that the signals should correspond with wheel rotation intervals.

Figure 6:
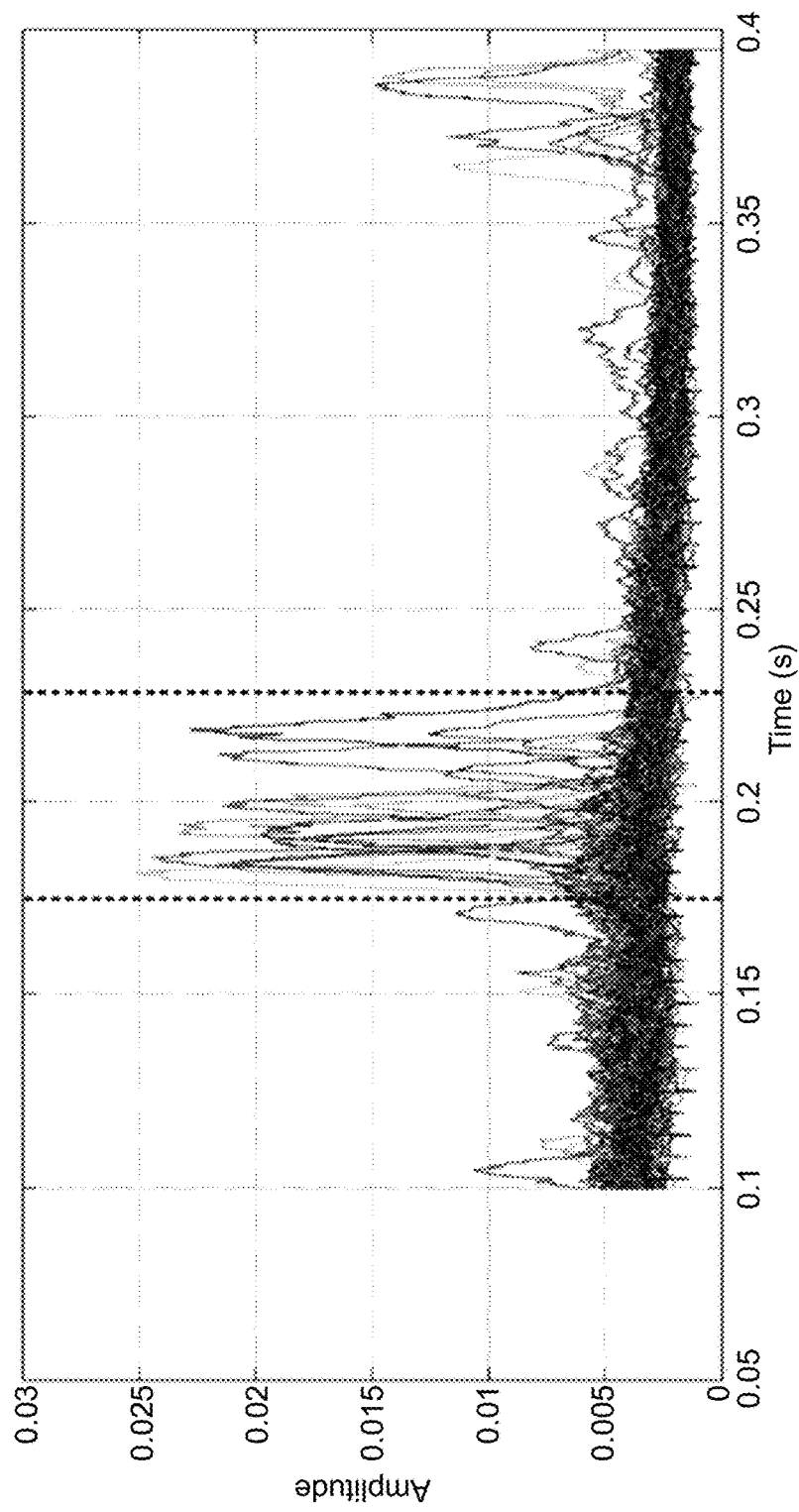
FIG. 6 shows a result of cepstrum-based analysis performed on a plurality of sample train records according to an embodiment.

To this extent, FIG. 6 shows a result of cepstrum-based analysis performed on a plurality of sample train records according to an embodiment. The sample train records included 129 records acquired from the passage of multiple trains, each of which passed multiple times during data collection. Each train record included the sum of the vibration data acquired by the set of vibration sensing devices during the passage of a train (e.g., similar to the data shown in FIG. 4). Of the trains, three included a railroad wheel having a wheel flat. The train speeds varied between approximately fifteen miles per hour (twenty-four kilometers per hour) and approximately fifty miles per hour (eighty kilometers per hour), with an average speed of approximately twenty-five miles per hour (forty kilometers per hour). As a result, the computer system 20 can perform cepstrum analysis on the train records at times between 0.1 and 0.4 seconds, corresponding to the wheel rotation intervals for the range of train speeds.

As illustrated in FIG. 6, the cepstrum data shows a strong peak of amplitudes centered at approximately 0.2 seconds, which corresponds to the wheel rotation interval for the average speed of the trains when the train records were generated. The height of each peak corresponds both to the number of impulses (flat signals) detected and to the amplitude of each impulse. As a result, the peak height of each cepstrum result is very strongly correlated with the severity of the wheel flat, and not strongly correlated with the speed of the train.

Because of this, the computer system 20 can detect and estimate the severity of wheel flats for trains operating at nearly any speed, including speeds both considerably lower and higher than those possible in previous approaches. In addition, the sensitivity of the solution described herein is such that the computer system 20 can detect much smaller flats than are possible in previous approaches. As even small wheel flats increase wear and damage and reduce efficiency and wheel lifetime, this is an important result for railroads in a number of ways.

Furthermore, the computer system 20 can use the cepstrum data for additional analysis of a train and/or the railroad wheels. For example, the computer system 20 can use the cepstrum data to identify a particular rail vehicle and/or train. In experimental data, cepstrum analysis of a particular train can provide a "fingerprint" of the train, which is not merely related to the variation of the wheels. Rather, any given train had a cepstrum fingerprint (signature) that was distinctly different from that of any other train. To this extent, by further analyzing the cepstrum data, the computer system 20 can extract additional information relating to each train, e.g., related to a mechanical source located on the train, which can assist in making maintenance and/or safety decisions regarding continued operation of the train. For example, the computer system 20 can use the cepstrum fingerprint to evaluate and monitor deviations to the cepstrum fingerprint across a large fleet of vehicles to perform trending analysis and/or defect identification.

The computer system 20 can perform cepstrum analysis to detect any periodic signals in a given set of data, with appropriate constraints on the analysis. To this extent, the computer system 20 can detect and direct repair of defects which are currently difficult to notice, but which would of necessity produce clear, if inherently low-level, signals of a periodic nature correlated with wheel rotation periods. Illustrative defects include, but are not limited to, truck misalignment, out-of-round wheels, lobed wheels, wheel shelling, broken wheels, cracked wheels, bad bearings, broken springs, weak suspension dampers, and/or the like. In each case, analysis of the vibration data using a solution similar to that described herein can yield a periodic signal indicative of the corresponding flaw. In a more particular embodiment, the computer system 20 can utilize an artificial intelligence solution to learn to identify a train, detect changes to the cepstrum signature of the train indicative of a flaw, discern properly operating trains from those requiring maintenance and/or unsafe to operate, and/or the like.

The computer system 20 can derive additional information from the signal data acquired by the vibration sensing devices 44A-44D. For example, using the typical signal generated by railroad wheels and wheel trucks operating properly, the computer system 20 can determine one or more additional aspects of the train operation, such as its speed and/or size (diameter) of the railroad wheels. For example, the speed of the train can be calculated based on the time difference between the peak signal generated by a particular wheel and wheel truck at two vibration sensing devices 44A-44D having a known spacing. The diameter of the railroad wheels can be determined using the speed and the cepstrum frequency (quefrequency).

While embodiments described herein can be utilized in conjunction with rail-based transit applications, it is understood that embodiments can be utilized in conjunction with evaluating freight trains. For example, in an embodiment, the set of sensors 40 (FIG. 1) can be mounted to rail(s) located at an entrance to a freight rail yard (e.g., a classification yard). As a freight train or a consist passes, the computer system 20 can evaluate the railroad vehicles (e.g., for railroad wheels including wheel flats, and/or other defects described herein), and communicate with a user system 12 (FIG. 1) information regarding one or more railroad vehicles (and information regarding the corresponding component(s), such as a location of a railroad wheel) requiring maintenance or replacement. In response, the user system 12 can direct the corresponding railroad vehicle to a maintenance area and provide information regarding the corresponding defect(s).

Unlike many transit rail vehicles, freight railroad vehicles have solid metal axles with wheels affixed to either end. As a result, a wheel flat impact on one railroad wheel will be transmitted with significant amplitude to the railroad wheel on the other side through the axle. In an embodiment, the computer system 20 can compare amplitudes of flat spot impacts detected on both rails to determine which railroad wheel actually has the wheel flat and which is merely receiving the impact signal. For certain embodiments in which lower vibration signals are sufficient for processing and analysis, the vibration sensing devices can be located on only one rail and/or half of the vibration sensing devices can be located on each rail (e.g., in a zigzag pattern).

While the illustrative embodiment shown in FIG. 2 includes a single computer system 20 and a single group of vibration sensing devices 44A-44D, it is understood that embodiments can be implemented with multiple computer systems 20 and/or multiple groups of vibration sensing devices 44A-44D. For example, an embodiment can include multiple groups of vibration sensing devices 44A-44D sequentially located along a railroad, which can be operated by a set of computer systems 20 to provide redundancy and additional precision to the evaluation of the railroad wheels and/or railroad vehicles described herein. In a more particular embodiment, three groups of four vibration sensing devices 44A-44D can be operated to acquire independent sensor data sets, which the computer system 20 can compare in various ways to ensure the detection of all flat spots or other wheel and/or railroad vehicle conditions, and to allow the detection and measurement to be further refined.

FIG. 7 shows an illustrative environment 10 for evaluating a railroad vehicle according to still another embodiment. In this case, the environment 10 includes two computer systems 20A, 20B and two groups of sensing devices 40A, 40B. In a more particular embodiment, each group of sensing devices 40A, 40B can include an identical set of sensing devices. For example, each group of sensing devices 40A, 40B can include a set of four vibration sensing devices as described herein, one or more wheel sensing devices, and/or the like. Furthermore, each vibration sensing device can be mounted in a space between adjacent railroad ties supporting the rails, also known as a crib.

During normal operation, the computer system 20A can receive and process sensor data from the group of sensing devices 40A and the computer system 20B can receive and process sensor data from the group of sensing devices 40B. However, as illustrated, each group of sensing devices 40A, 40B also can provide data to the other computer system 20B, 20A, respectively. In this configuration, the environment 10 includes redundant connections to ensure that no failure in any single component of the environment 10 can cause a failure of an ability of the environment 10 to evaluate passing railroad wheels and/or railroad vehicles as described herein.

In particular, a failure of one of the computer systems 20A, 20B will result in only one of the computer systems 20A, 20B performing real time evaluation, but will not result in the loss of any of the raw data acquired by the other group of sensing devices 40A, 40B. In a further embodiment, the computer systems 20A, 20B can exchange a heartbeat signal or the like, and in the event of the failure of receiving such a signal, the computer system 20A, 20B can process the sensor data received from both groups of sensing devices 40A, 40B in real time. Similarly, in the event of the failure of one of the sensing devices in a group of sensing devices 40A, 40B, sufficient data will continue to be acquired by the other group of sensing devices 40A, 40B to enable the evaluation of passing railroad vehicles as described herein.

Regardless, in the event of detection of significant vibrations and/or flat spots by a computer system 20 (e.g., either of the computer systems 20A, 20B), such detection can be forwarded to a user system 12 (FIG. 2) as described herein for further action. In an embodiment, the user system 12 can comprise one or more vibration-sensitive devices and/or be performing one or more vibration-sensitive processes, the operation of which may be affected by the significant vibrations (e.g., caused by wheel flats) generated by a passing train. In this case, the user system 12 can adjust operation of the vibration-sensitive device(s) and/or performance of the vibration-sensitive process(es) while the train passes. For example, the user system 12 can temporarily shut down operation of the vibration-sensitive device(s), halt or delay a vibration-sensitive process, and/or the like, while the train passes. To this extent, the computer system 20 also can signal the user system 12 after the train has passed, and the user system 12 can start/restart the vibration-sensitive device(s) and/or process(es) in response thereto (e.g., after providing sufficient time for the train to clear the area). Illustrative vibration-sensitive devices include, for example: machines/devices operating in a manufacturing facility (e.g., a microchip fabrication plant, or other micro-etching/manufacturing facility) in which accuracies on a scale of microns or less are necessary; medical research instrumentation (e.g., nuclear magnetic resonance (NMR), functional magnetic resonance imaging (fMRI), and/or the like); etc.

In an embodiment, the computer system 20 can provide the user system 12 with data regarding the vibrations generated by the passing train, which may include excessive vibrations, such as those generated by a wheel flat, or normal vibrations. In response, the user system 12 can use the vibration data, for example, to compensate for the train vibrations in data collected during operation of vibration-sensitive device(s) and/or performance of vibration-sensitive process(es).

While shown and described herein as a method and system for evaluating a railroad vehicle and more particularly the railroad wheels of a railroad vehicle, it is understood that aspects of the invention further provide various alternative embodiments. For example, in one embodiment, the invention provides a computer program fixed in at least one computer-readable medium, which when executed, enables a computer system to evaluate a railroad vehicle as described herein. To this extent, the computer-readable medium includes program code, such as the evaluation program 30 (FIG. 1), which enables a computer system to implement some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; and/or the like.

In another embodiment, the invention provides a method of providing a copy of program code, such as the evaluation program 30 (FIG. 1), which enables a computer system to implement some or all of a process described herein. In this case, a computer system can process a copy of the program code to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of the program code, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for evaluating a railroad vehicle. In this case, the generating can include configuring a computer system, such as the computer system 20 (FIG. 1), to implement a method of evaluating a railroad vehicle as described herein. The configuring can include obtaining (e.g., creating, maintaining, purchasing, modifying, using, making available, etc.) one or more hardware components, with or without one or more software modules, and setting up the components and/or modules to implement a process described herein. To this extent, the configuring can include deploying one or more components to the computer system, which can comprise one or more of: (1) installing program code on a computing device; (2) adding one or more computing and/or I/O devices to the computer system; (3) incorporating and/or modifying the computer system to enable it to perform a process described herein; and/or the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method of evaluating a railroad vehicle, the method comprising:
    a computer system acquiring vibration data from a plurality of vibration sensing devices located at a plurality of locations along a path the railroad vehicle is traveling;
    the computer system processing the vibration data to identify any anomalous vibration features, wherein the identifying includes determining that a vibration feature was detected by at least two of the plurality of vibration sensing devices at highly temporally coherent times;
    in response to identifying a plurality of anomalous vibration features in the vibration data, the computer system evaluating the plurality of anomalous vibration features for an indication of a presence of at least one defect on the railroad vehicle, wherein the at least one defect produces signals as the railroad vehicle travels along the path; and
    the computer system identifying the railroad vehicle as including a defect in response to identifying the indication of the defect on the railroad vehicle.

2. The method of claim 1, wherein the computer system processing includes the computer system generating enhanced signal data from the vibration data, wherein the generating enhanced signal data includes:
    the computer system generating signal data for the vibration data acquired from each of the plurality of vibration sensing devices; and
    the computer system adding the signal data for each of the plurality of vibration sensing devices to generate the enhanced signal data.

3. The method of claim 2, wherein the computer system processing further includes the computer system identifying anomalous vibration peaks within the enhanced signal data.

4. The method of claim 2, wherein the computer system processing further includes the computer system identifying any enhanced signal data exceeding a maximum noise peak level.

5. The method of claim 1, wherein the at least one defect includes at least one of: a wheel flat, an out of round wheel, wheel shelling, a broken wheel, a cracked wheel, a broken spring, or a weak suspension damper.

6. The method of claim 1, wherein the evaluating the plurality of anomalous vibration features includes the computer system evaluating a time spacing between the plurality of anomalous vibration features, wherein a plurality of anomalous vibration features having a substantially uniform time spacing indicates the defect.

7. The method of claim 6, wherein the evaluating the plurality of anomalous vibration features further includes the computer system comparing the substantially uniform time spacing with a time for a wheel revolution of a railroad wheel on the railroad vehicle, wherein a substantially uniform time spacing approximately the same as the time for the wheel revolution indicates the defect.

8. The method of claim 1, further comprising the computer system transmitting a result of the evaluation for processing by a user system.

9. A railroad vehicle management system comprising:
    a plurality of vibration sensing devices located along a path railroad wheels travel, wherein the plurality of vibration sensing devices have a known spacing at a plurality of locations along the path; and
    a computer system including means for evaluating the railroad vehicle, wherein the means for evaluating is configured to:
        acquire vibration data from the plurality of vibration sensing devices;
        process the vibration data to identify any anomalous vibration features, wherein the identifying includes determining that a vibration feature was detected by at least two of the plurality of vibration sensing devices at highly temporally coherent times;
        in response to identifying a plurality of anomalous vibration features in the vibration data, evaluate the plurality of anomalous vibration features for an indication of a defect on the railroad vehicle; and
        identify the railroad vehicle as including a defect in response to identifying the indication of a defect on the railroad vehicle.

10. The system of claim 9, further comprising a set of wheel sensors located adjacent to the path, wherein the computer system activates the plurality of vibration sensing devices in response to receiving an indication of a railroad wheel from a wheel sensor in the set of wheel sensors.

11. The system of claim 9, wherein the defect is one of: a wheel flat, an out of round wheel, wheel shelling, a broken wheel, a cracked wheel, a broken spring, or a weak suspension damper.

12. The system of claim 9, wherein the plurality of vibration sensing devices includes no more than twelve vibration sensing devices for each side of the path.

13. The system of claim 9, further comprising a user system, wherein the computer system provides the user system with information relating to the evaluation of the railroad vehicle.

14. The system of claim 13, wherein the user system comprises a railroad vehicle management system, and wherein the information includes information relating to a presence of the defect.

15. The system of claim 13, wherein the user system comprises at least one vibration-sensitive device, and wherein the information includes information relating to the vibration generated by the railroad vehicle.

16. A method of evaluating a railroad wheel for a defect, the method comprising:
    a computer system acquiring vibration data from a plurality of vibration sensing devices located at a plurality of locations along a path the railroad wheel is traveling;
    the computer system processing the vibration data to identify any anomalous vibration features, wherein the identifying includes determining that a vibration feature was detected by at least two of the plurality of vibration sensing devices at highly temporally coherent times; and
    in response to identifying a plurality of anomalous vibration features in the vibration data, the computer system evaluating the plurality of anomalous vibration features for an indication of the defect on the railroad wheel based on a time spacing between the plurality of anomalous vibration features, wherein the defect produces signals on the path as the railroad vehicle travels along the path.

17. The method of claim 16, wherein the anomalous vibration features include anomalous vibration peaks, and wherein the evaluating the enhanced signal data includes the computer system identifying any enhanced signal data exceeding a maximum level.

18. The method of claim 16, further comprising in response to the railroad wheel including the indication of a defect, the computer system estimating a severity of the defect using a cepstrum analysis of the vibration data.

19. The method of claim 16, wherein the railroad wheel is one of a plurality of railroad wheels on a railroad vehicle, the method further comprising in response to the railroad wheel including the indication of a defect, the computer system identifying the railroad wheel on the railroad vehicle with the defect.

20. The method of claim 16, wherein the defect is one of: a wheel flat, an out of round wheel, wheel shelling, a broken wheel, or a cracked wheel.

\* \* \* \* \*